Jan. 25, 1955             A. VANG             2,700,746
MEANS FOR THE CONVERSION OF STORED ELECTRICAL
ENERGY INTO MECHANICAL ENERGY
Original Filed May 27, 1952             2 Sheets-Sheet 1
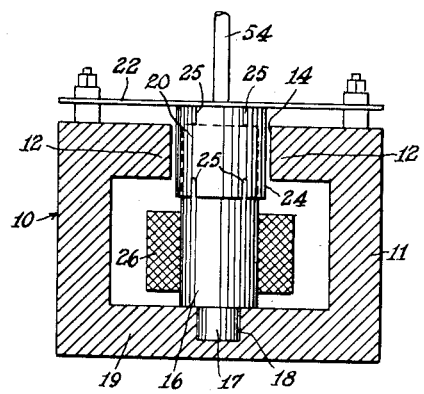
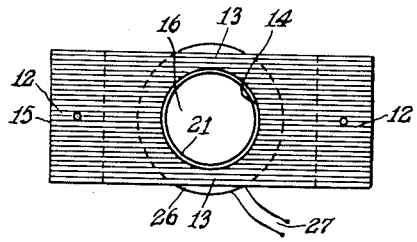
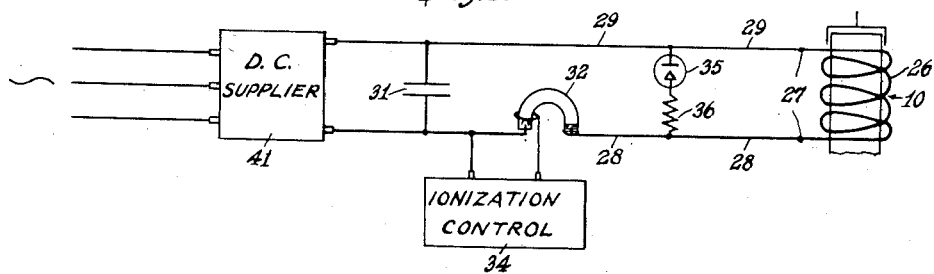
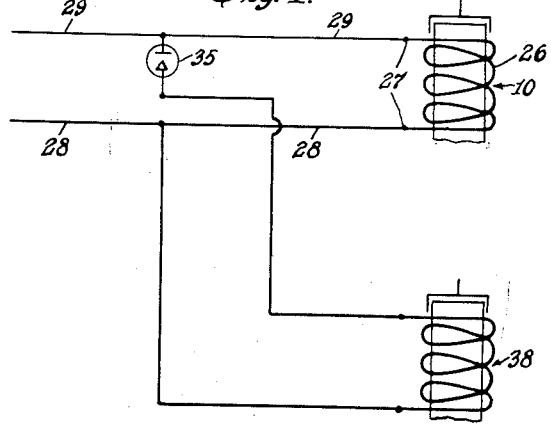
INVENTOR.
ALFRED VANG
BY *Peter M. Boesen*
ATTORNEY.

Jan. 25, 1955              A. VANG              2,700,746
MEANS FOR THE CONVERSION OF STORED ELECTRICAL
ENERGY INTO MECHANICAL ENERGY
Original Filed May 27, 1952              2 Sheets-Sheet 2

INVENTOR.
ALFRED VANG

BY Peter M. Boesen

ATTORNEY

United States Patent Office 2,700,746
Patented Jan. 25, 1955

2,700,746

MEANS FOR THE CONVERSION OF STORED ELECTRICAL ENERGY INTO MECHANICAL ENERGY

Alfred Vang, Carmel, Calif.

Substituted for application Serial No. 290,195, May 27, 1952. This application January 11, 1954, Serial No. 403,369

3 Claims. (Cl. 318—125)

This invention relates to means for the conversion of stored electrical energy into mechanical energy in the form of a sudden impact, such as required by tools for breaking up concrete, hammering and the like.

In the arts there are numerous requirements for a sudden expenditure of mechanical energy, and, frequently these requirements or demands are of an intermittent nature though the interval between the demands may vary widely and in various degrees of regularity. The result is, that at some particular instant, a large amount of energy must be available and perhaps the next instant the load may be zero. In such instances it has long been recognized that some form of stored energy is desirable. In mechanical devices this was formerly accomplished by the controlled movement of bodies having a large inertia such as flywheels for a stamping machine whereby a small source of power acting over a long period of time might be used to bring the flywheel up to speed. In such a use the flywheel would then possess an enormous amount of energy of rotation compared with the source of power used to set it in operation. By converting the energy stored in the flywheel into useful work in a short length of time the instantaneous power output became enormous.

Many machines, however, because of their inherent nature, do not lend themselves to utilize parts having a large mechanical inertia. As a consequence, where electrical energy is the source of power, instantaneous heavy demands must be satisfied by a source of power always sufficiently large to meet the peak loads. This of course necessitates a source far larger than would be required for the average load.

To overcome these difficulties I utilize electrical energy for charging a large condenser over a relatively long period of time and discharge the condenser rapidly to meet the short demand. The discharge of the condenser produces an oscillating current which, though rapidly damped, does produce an appreciable reverse current. The reverse current produces forces exactly opposite from those intended and desired so that any mechanism or reciprocating motor actuated by the discharge current is subjected to excessive strains. Furthermore since practical applications require an A. C. power source and incidental rectifiers, the reverse current (representing an energy value in excess of that of charging current at the particular instant) damages the rectifiers. To overcome the objections produced by the reverse current I provide a unidirectional conductor across the load to conduct only the reverse current so that the reverse current may not only be shunted but may be utilized to advantage. These features for utilizing the condenser discharge are shown in several embodiments in the drawing, as examples of many possibilities, wherein Figure 1 is a vertical sectional view partly as a side elevation of the reciprocating motor utilizing the discharge of the condenser.

Figure 2 is a plan showing portions of the motor of Figure 1.

Figure 3 is a schematic diagram showing means for shunting the reverse current.

Figure 4 is a similar diagram showing auxiliary use of the reverse current.

Figure 5:
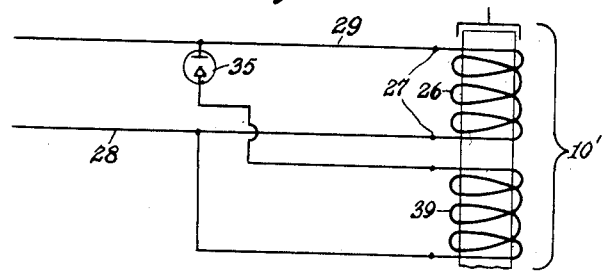
Figures 5 and 6 are likewise similar diagrams showing other means for utilizing the reverse current.

In Figure 1 the reciprocating motor 10 comprises a magnet frame 11 of substantially U-shaped construction and having inwardly directed pole pieces 12 at the extremities of the arms thereof, the inner ends of the pieces terminating in cylindrically curved vertical planes 14. As will be apparent below the pole pieces are of like polarity and may be bridged with side laminations 13. The frame and pole pieces are composed of laminations or magnetic material 15 having substantially the shape of the frame as a whole to reduce eddy currents which arise in use. A core part 16 of cylindrical shape has the lower end 17 of reduced diameter secured tightly in a hole 18 in the yoke 19 of the frame and is magnetically integral with the yoke while the upper end 20 of the core part projects upwardly between the curved faces of the pole pieces leaving a narrow gap 21 therebetween. The diameter of the core part is preferably less than the thickness of the frame.

An impact member mount herein shown as 22 is resistently mounted on the upper part of the frame and has depending therefrom an armature sleeve 24 of conducting material secured on the impact member mount as on the lower face of the diagram and received for vertical movement in the gap 21 between the upper end of the core part and the pole pieces, the portions of the sleeve above the gap being provided with longitudinal slots 25 to prevent a flow of current in the sleeve portions remote from the gap. The sleeve functions as a single turn armature winding into which a current is induced. A winding 26 around the core part and provided with terminal leads 27 is connected by conductors 28, 29 to a condenser 31 as shown in Figure 5.

A mercury arc discharge tube switch 32 interposed in one of the conductors between the winding 26 and the condenser and means 34 are provided for periodically ionizing the contents of the tube. A unidirectional conducting means 35 such as described in United States Patent 2,287,541 or a thermionic valve and resistance 36 in series therewith are shunted across said leads to shorten or dissipate the reverse current.

In high power use the reverse current may be so large that dissipation of the energy of the reverse current not only is wasteful but dangerous. Hence, the resistance 36 may be replaced by an additional motor 38 serving as a useful load as in Figure 4.

Instead of employing two separate motors I may provide the core part 16 with an additional winding 39 forming a similar motor 10' (Figure 5) so that the reverse current may be used to impart reverse motion to the sleeve but in a different phase relationship. This is accomplished by connecting coil 39 to replace resistance 36. The coil will also "clean" the magnet in the operation. Care must, however, be exercised in the connection of the coil 39 to insure proper polarity.

Figure 6:
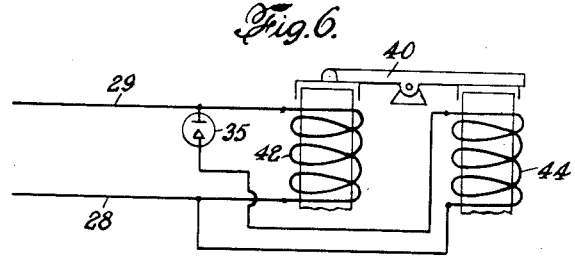

In yet another form of the invention, two motors 42 and 44 each generally similar to motor 10, having separate armatures but each mounted on the same impact member 40 may be used, as in Figure 6.

Conventional means 41 may be employed to charge the condenser 31. This may operate on any suitable power supply such as single or polyphase A. C. with rectification when the load is large.

In operation the condenser is trickle charged and discharged at the desired instant by ignition of the tube. Most of the energy of discharge is expended in one large sudden surge, the reverse current or second half of the wave is shunted through the resistance or the auxiliary windings wherever located. The subsequent waves are of such small magnitude as to be virtually non-existent.

In practice the condenser is charged at about 4,000 volts and discharged at frequencies as low as desired and as high as the impedance of the circuit will permit.

Figure 7:
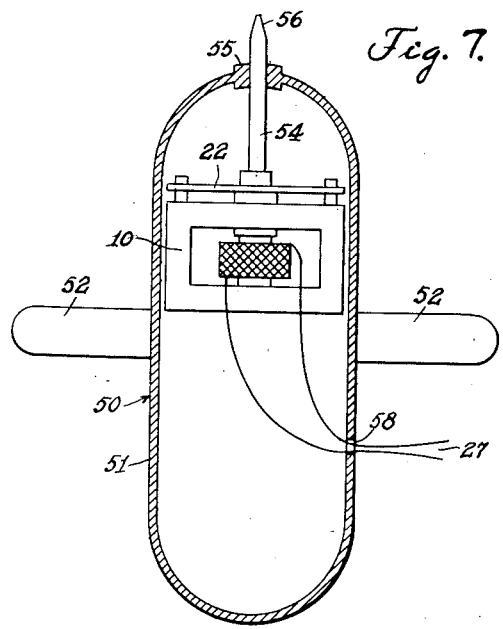
Figure 7 is a sectional view showing the combination of the motor and tool.

As embodied in a reciprocatory hammer 50 (Figure 7) the motor 10 is secured by means (not shown) to and within the interior of a substantially closed tubular casing 51 provided with suitable laterally projecting external handles 52. An elongated rod-like tool 54 mounted fast on the mount 22 perpendicular thereto passes through a bearing boss 55 and is provided with a suitable end piece 56 according to the use to which the hammer or device is put. The motor leads 27 are passed through the casing

The invention claimed is:

1. In combination, a reciprocatory electromagnetic motor having an armature and a winding associated therewith provided with terminal leads, a condenser and means for charging same, said terminal leads being connected to the respective sides of the condenser, a mercury arc discharge tube switch interposed between the windings and the condenser and means for periodically ionizing the contents of the tube, a second motor connected across said leads, and unidirectional conducting means interposed between one of said leads and the second motor for conducting reverse current through said second motor.

2. A combination as claimed in claim 1 and an impact member attached to the two armatures of the respective motors.

3. In combination a reciprocatory electromagnetic motor having an armature and a winding associated therewith provided with terminal leads, a condenser and means for charging same, said terminal leads being connected to the respective sides of the condenser, a mercury arc discharge tube switch interposed between the winding and the condenser and means for periodically ionizing the contents of the tube, a second winding associated with said armature connected in parallel with first at said leads, a unidirectional conducting means interposed between the second winding and one of the leads.

References Cited in the file of this patent

UNITED STATES PATENTS

| Number | Name | Date |
|---|---|---|
| 387,310 | Mather | Aug. 7, 1888 |
| 1,853,695 | Mortimer | Apr. 12, 1932 |
| 1,966,077 | Nyman | July 10, 1934 |
| 2,181,309 | Andrieu | Nov. 28, 1939 |
| 2,235,385 | Rava | Mar. 18, 1941 |
| 2,425,767 | Vang | Aug. 19, 1947 |
| 2,442,609 | Levow | June 1, 1948 |
| 2,525,872 | Dawson | Oct. 17, 1950 |